(12) United States Patent
Brown (10) Patent No.: US 7,822,657 B2
(45) Date of Patent: *Oct. 26, 2010

(54) AUTOMATED ACCOUNTING SYSTEM

(75) Inventor: Gordon T. Brown, Pittsburgh, PA (US)

(73) Assignee: Noah Systems, Inc., Pittsburgh, PA (US)

( * ) Notice: Subject to any disclaimer, the term of this patent is extended or adjusted under 35 U.S.C. 154(b) by 846 days.

This patent is subject to a terminal disclaimer.

(21) Appl. No.: 09/975,458

(22) Filed: Oct. 11, 2001

(65) Prior Publication Data

US 2002/0046058 A1 Apr. 18, 2002

Related U.S. Application Data (63) Continuation of application No. 08/313,988, filed on Sep. 28, 1994, now abandoned.

(51) Int. Cl.
*G06Q 40/00* (2006.01)
(52) U.S. Cl. ...................................................... 705/35
(58) Field of Classification Search .................. 705/35, 705/40, 30, 44, 45; 235/370, 379, 380, 375; 382/137; 379/91.01; 713/201; 714/47, 48; 725/9; 205/39; 902/22
See application file for complete search history.

(56) References Cited

U.S. PATENT DOCUMENTS 2,509,718 A 5/1950 Barbey (Continued)

FOREIGN PATENT DOCUMENTS

GB 2 251 098 A 6/1992

(Continued)

OTHER PUBLICATIONS

The Depository Trust Company, About DTC, http://dtcservices.dtcc.com/aboutdtc/dtcintro/dtcintro.*

(Continued)

*Primary Examiner*—Alexander Kalinowski
*Assistant Examiner*—Bijendra K Shrestha
(74) *Attorney, Agent, or Firm*—Alan G. Towner, Esq.; Pietragallo Gordon Alfano Bosick & Raspanti, LLP (57) ABSTRACT

An automated accounting system for an entity, such as an individual or business is provided in which at least one file is established for the entity and a plurality of data inputs are provided to the file. The data inputs include electronically recorded transactions made between the entity and other entities. Access is provided to the file for agents of the entity so that one of the agents can perform one or more activities related to the data inputs such as entering, deleting, reviewing, adjusting and processing.

8 Claims, 4 Drawing Sheets

U.S. PATENT DOCUMENTS

| | | | |
|---|---|---|---|
| 2,693,909 A | | 11/1954 | Allan |
| 3,040,984 A | | 6/1962 | Cox et al. |
| 3,492,655 A | | 1/1970 | Deskevich et al. |
| 3,623,012 A | | 11/1971 | Lowry |
| 3,697,693 A | | 10/1972 | Deschenes et al. |
| 3,727,186 A | | 4/1973 | Stephenson, Jr. et al. |
| 3,749,892 A | | 7/1973 | Stenning |
| 3,852,571 A | | 12/1974 | Hall et al. |
| 3,985,998 A | * | 10/1976 | Crafton ................. 235/61.7 B |
| 4,025,905 A | | 5/1977 | Gorgens |
| 4,222,109 A | | 9/1980 | Siwula |
| 4,264,808 A | | 4/1981 | Owens et al. |
| 4,277,837 A | | 7/1981 | Stuckert |
| 4,308,588 A | | 12/1981 | Siwula |
| 4,321,672 A | * | 3/1982 | Braun et al. ................... 705/42 |
| 4,341,951 A | * | 7/1982 | Benton ........................ 235/379 |
| 4,370,649 A | | 1/1983 | Fuerle |
| 4,376,978 A | | 3/1983 | Musmanno |
| 4,412,287 A | | 10/1983 | Braddock, III |
| 4,460,965 A | | 7/1984 | Trehn et al. |
| 4,536,647 A | * | 8/1985 | Atalla et al. ................. 235/379 |
| 4,549,264 A | | 10/1985 | Carroll et al. |
| 4,569,029 A | | 2/1986 | Hatta et al. |
| 4,594,663 A | | 6/1986 | Nagata et al. |
| 4,713,761 A | | 12/1987 | Sharpe et al. |
| 4,727,243 A | | 2/1988 | Savar |
| 4,799,156 A | | 1/1989 | Shavit et al. |
| 4,823,265 A | * | 4/1989 | Nelson ......................... 705/35 |
| 4,837,556 A | * | 6/1989 | Matsushita et al. ...... 340/310.01 |
| 4,857,714 A | * | 8/1989 | Sunyich ....................... 235/382 |
| 4,953,085 A | | 8/1990 | Atkins |
| 4,958,368 A | * | 9/1990 | Parker .......................... 379/91 |
| 4,989,141 A | * | 1/1991 | Lyons et al. ................. 364/408 |
| 5,056,019 A | * | 10/1991 | Schultz et al. ............... 364/405 |
| 5,093,787 A | | 3/1992 | Simmons |
| 5,117,356 A | * | 5/1992 | Marks .......................... 705/30 |
| 5,126,936 A | | 6/1992 | Champion et al. |
| 5,144,115 A | | 9/1992 | Yoshida |
| 5,146,067 A | * | 9/1992 | Sloan et al. .................. 235/381 |
| 5,172,313 A | | 12/1992 | Schumacher |
| 5,193,055 A | | 3/1993 | Brown et al. |
| 5,202,826 A | | 4/1993 | McCarthy |
| 5,206,803 A | * | 4/1993 | Vitagliano et al. .......... 364/408 |
| 5,220,500 A | | 6/1993 | Baird et al. |
| 5,220,501 A | | 6/1993 | Lawlor et al. |
| 5,237,159 A | * | 8/1993 | Stephens et al. ............. 235/379 |
| 5,262,942 A | * | 11/1993 | Earle ........................... 705/37 |
| 5,265,007 A | * | 11/1993 | Barnhard, Jr. et al. ....... 364/408 |
| 5,283,829 A | | 2/1994 | Anderson |
| 5,287,270 A | | 2/1994 | Hardy et al. |
| 5,325,290 A | | 6/1994 | Cauffman et al. |
| 5,326,959 A | | 7/1994 | Perazza |
| 5,383,113 A | | 1/1995 | Kight et al. |
| 5,406,475 A | | 4/1995 | Kouchi et al. |
| 5,412,190 A | * | 5/1995 | Josephson et al. ........... 235/379 |
| 5,420,405 A | * | 5/1995 | Chasek ........................ 235/379 |
| 5,453,601 A | | 9/1995 | Rosen |
| 5,471,669 A | * | 11/1995 | Lidman ....................... 235/383 |
| 5,517,406 A | | 5/1996 | Harris et al. |
| 5,649,115 A | | 7/1997 | Schrader et al. |
| 5,649,117 A | * | 7/1997 | Landry ........................ 395/240 |
| 5,740,271 A | | 4/1998 | Kunkler et al. |
| 5,842,185 A | | 11/1998 | Chancey et al. |
| 5,875,435 A | | 2/1999 | Brown |
| 5,930,778 A | * | 7/1999 | Geer ............................ 705/45 |
| 5,946,669 A | * | 8/1999 | Polk ............................ 705/40 |
| 6,226,624 B1 | * | 5/2001 | Watson et al. ................ 705/44 |
| 6,283,761 B1 | * | 9/2001 | Joao ............................ 434/236 |
| 6,417,871 B1 | | 7/2002 | Nomura et al. |

FOREIGN PATENT DOCUMENTS

| | | | |
|---|---|---|---|
| JP | 5458332 | | 5/1979 |
| JP | 54058332 | | 5/1979 |
| JP | 03223958 | | 10/1991 |
| JP | 03242793 | | 10/1991 |
| JP | 05216861 | | 8/1993 |
| JP | 07085181 | | 3/1995 |
| JP | 07085181 A | | 3/1995 |
| WO | WO 92/04679 | | 3/1992 |
| WO | WO 9927477 | * | 6/1999 |

OTHER PUBLICATIONS

Cushing, Barry E. et al., Accounting Information Systems: A Comprehensive Approach, 1990, Addison-Wesley Publishing Company, 5th edition, Chapters 1-3, and pp. 130-131, Fig. 7.22, pp. 267-266,280-281,425,428-429,Fig. 11.31 and G-28.*

Glass et al.: Activity-based management accounting for DoD Depot maintenance, Logistic management Institute, Virginia, Aug. 1994, pp. 1-36.*

Lin, Fengyi: A unified accounting information framework to modeling bank accounting systems, Journal of Applied Business Research, vol. 20, No. 4, fall 2004, pp. 109-116.*

Kadlec, "A consolidated approach to investment fund management", *TMA Journal*, Sep./Oct. 1994, vol. 14, No. 5, pp. 42-46.

Brown, U.S. Appl. No. 09/975,457 Entitled "Automated Accounting System", filed Oct. 11, 2001.

Yoder, S., Knight, S. And J. Langdell, "Five Financial Programs for the Home," *PC Magazine*, Feb. 1983, pp. 106, vol. 1, No. 10.

Olivieri, P., "Mind Your Business: Not Another Checkbook Program," *Softalk*, Oct. 1983, pp. 258, vol. 4.

Wilkens, Robert P., "How Lawyers Can Use Microcomputers", Byte Magazine; May 1984 pp. 160-167; R.P.W. Publishing Company.

Dow Jones General Ledger, Byte Magazine May 1984.

Harrison, Tom, "Recordkeeping for Small Businesses", 1985, The American Association of Small Business Accountants.

Magid, Lawrence J., "Software Speeds Banking-at-Home with Checkbook-Balancing Function," *Washington Post*, Nov. 7, 1988, pp. F29.

Jones, Mitt, "After Hours: Products for the Leisure Side of Personal Computing," PC Magazine, Nov. 14, 1989, pp. 513-514.

Jones, Mitt, "CheckFree," PC Magazine, Jan. 1, 1990, pp. 144-145, vol. 9 No. 1.

Shipley, Chris, "CheckFree 3.0 (CheckFree Corp.)(Software Review) (one of eight evaluations of personal-finance software packages in 'Bank on Software for Easy Money Management')," *PC Computing*, Jan. 1993, pp. 300, vol. 6, No. 1.

Interview with Don Kniffin. *TMA Journal*, Jan./Feb. 1994, pp. 34-38, vol. 14 issue 1.

The American Express Platinum Card, http://home1.americanexpress.com/apply/platinum/card/docs/page1b0.asp, Nov. 1, 2000.

Cushing et al., Accounting Information Systems, Sixth Edition, published Aug. 31, 1993, Addison-Wesley Publishing Company.

"Why majors have the cutting edge in proprietary debit cards", National Petroleum News, v80, n12, p34(5), Nov. 1988. (partial text).

Toshiba Corporation, Agent III, Accounting Consolidation Sub-System, Nov. 11, 1992, A1, pp. 2-26, Japan.

Altman, "Check Free: A Viable Bill-Paying Alternative", Link-up, Jan./Feb. 1991, 8, 1, p. 22.

Microsoft Money Version 3.

"Quicken User Manual: Version 1.01 for Windows", Intuit Inc., 1991.

"Quicken User's Guide: Version 6 for IBM and PC Compatibles", Intuit Inc., Feb. 1993.

"Quicken User's Guide: Version 4 for Macintosh", Intuit Inc., May 1993.

"Quicken User's Guide: Version 7 for IBM and PC Compatibles", Intuit Inc., Sep. 1993.

Page et al., "Accounting and Information Systems", 4th Ed., Prentice-Hall Publishing, 1992.

Rahman et al., "Accounting Information Systems: Principles, Applications, and Future Directions", Prentice-Hall Publishing, 1988.

Boockholdt, "Accounting Information Systems: Transaction Processing and Controls", 3rd Ed., Irwin Publishing, 1993.

Page et al., "Accounting and Information Systems", 3rd Ed., Prentice-Hall Publishing, 1987.

Wilkinson, "Accounting Information Systems: Essential Concepts and Applications", John Wiley & Sons, Inc., 1989.

Wilkinson, "Accounting Information Systems: Essential Concepts and Applications", 2nd Ed., John Wiley & Sons, Inc., 1993.

Gelinas et al., "Accounting Information Systems", 2nd Ed., South-Western College Publishing Co., 1993.

Davis et al., "Accounting Information Systems: A Cycle Approach", 3rd Ed., John Wiley & Sons, Inc., 1990.

Nash et al., "Accounting Information Systems", 3rd Ed., South-Western Publishing, 1993.

Bodnar et al., "Accounting Information Systems", 5th Ed., Prentice-Hall, Inc., 1993.

Cushing et al., "Accounting Information Systems and Business Organizations", 4th Ed., Addison-Wesley Publishing, 1987.

Wilkinson, "Accounting and Information Systems: Study Guide", 3rd Ed., John Wiley & Sons, Inc., 1991.

Maduegbuna, "A Critical Appraisal of the Continued Relevance of Bills of Exchange in an International Electronic Trade Environment", U. of Alberta, Master of Law Thesis, 1992.

Antonio, "The Usefulness of the 'Audit Trail' in Electronic Data Processing Systems", Univ. Of Illinois, Ph.D. dissertation, May 22, 1967.

Smith, "Transnational Banking Networks: A Telecommunications and Microcomputer Application for Small Offshore Operations", U.S. Int'l Univ., Ph.D. dissertation, May 17, 1982.

Summers, "Accounting Information Systems", Houghton Mifflin Company, 1989.

Leitch et al., "Accounting Information Systems Theory and Practice", 2nd Ed., Prentice-Hall, Inc., 1992.

Altman, "CheckFree: A Viable Bill-Paying Alternative", PC Magazine, Jan. 16, 1990.

\* cited by examiner

AUTOMATED ACCOUNTING SYSTEM

CROSS REFERENCE TO RELATED APPLICATION

This application is a continuation of application Ser. No. 08/313,988 filed Sep. 28, 1994.

BACKGROUND OF THE INVENTION

This invention relates to an automated accounting system, and more particularly, to providing an automated accounting system for an entity such as an individual or a business in which a plurality of data inputs are made to a file established for the entity, the data inputs including electronically recorded financial transactions made between the entity and other entities. Access is provided to the file for agents of the entity being served so that one of the agents can perform one or more activities related to the data inputs, such as entering, deleting, reviewing, adjusting and processing the data inputs.

There have been proposed a number of systems and methods in which financial and business information has been computerized. My U.S. Pat. No. 5,193,055 discloses an accounting system in which a standard category code listing is used to code money transfer instruments, such as checks, into a computer file. The information in that computer file is then used to generate various accounting reports. The standard category codes can be personalized in order to meet the particular needs of the user. For example, job numbers can be coded on the check to track income and expense for individual projects.

U.S. Pat. No. 5,220,501 discloses a method and system for remote delivery of retail banking services. A user can access an ATM (Automatic Teller Machine) from a dedicated remote data terminal in order to transfer funds from a bank account to a third party payee. A central computer receives instructions from the remote terminal and debits the user's bank account as well as distributing the funds to payees requested by the user. See also U.S. Pat. No. 5,202,826.

Despite the existence of these systems, no one has conceived a total accounting system in which users, such as businesses, individuals, merchants, financial institutions and other entities are connected into a network where financial transaction information is captured, analyzed, reviewed, adjusted and processed and then used to generate accounting statements.

As computer hardware technology becomes more advanced and less expensive, many if not most financial transactions will be electronically recorded. For example, if a customer purchases a building product, such as a window, from a building products dealer, that sale can be electronically recorded in a ledger in the building product dealer's computer. No one, however, has conceived of a system in which the user and the building product dealer are connected in a network such that the recorded financial transaction, along with all other financial transactions recorded in the network, could be used to generate accounting records useful to the members of the network.

The recorded financial transactions, in order to be useful to the multitude of different users in the network, must be accessible to various agents. There is a need therefore for agents, such as accountants, to have access to the recorded financial transactions before, during and after the financial transaction is made. In this way, electronically recorded financial transactions can be entered, deleted, reviewed, adjusted and/or processed in order to provide the proper input data for the system.

After the data has been entered and reviewed, it would be desirable for the user to be able to choose which services are required from the system. For example, an individual may only be interested in obtaining tax accounting services, whereas a business may need a more complete set of financial reports.

Finally, an effective system must have a funds transfer clearinghouse, such as that disclosed in U.S. Pat. Nos. 5,220, 501 and 5,202,826.

What is needed, therefore, is a connected system (or network) of users, such as individuals, businesses, merchants, financial institutions and other entities, that can provide its users a method of automating the accounting of all financial transactions made by the user and other entities in the network.

SUMMARY OF THE INVENTION

An automated accounting system for an entity, such as an individual or business is provided in which at least one file is established for the entity and a plurality of data inputs are provided to the file. The data inputs include electronically recorded transactions made between the entity and other entities. Access is provided to the file for agents of the entity so that one of the agents can perform one or more activities such as entering, deleting, reviewing, adjusting and processing.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENTS

The method and system of the invention provide an automated accounting system which brings together in a connected or network fashion, all of the various entities that are involved with financial transactions between a first entity, such as an individual or a business, and other entities, such as merchants, financial institutions and the like. The financial transactions are recorded as data inputs in a file established for the first entity. The data inputs can be accessed by agents of the first entity, such as accountants, money managers and the entity itself, in order to enter, delete, review, adjust or process the data inputs.

The first entity can be a business or an individual. The entity being served will have established at a central or host computer a master ledger that is used to receive data inputs in the form of electronically recorded financial transactions. It will be appreciated, however, that the central or host computer can be the individual entity's personal automatic computing device (such as a personal computer or a telephone computing device) which can receive the data inputs and, in the case of a personal computer, for example, process the data inputs by using off-the-shelf accounting software. Therefore, even though the specification set forth herein will focus on a central or host computer, it will be appreciated that the above mentioned alternatives of a personal or telephone computer are contemplated by the invention.

Figure 1:
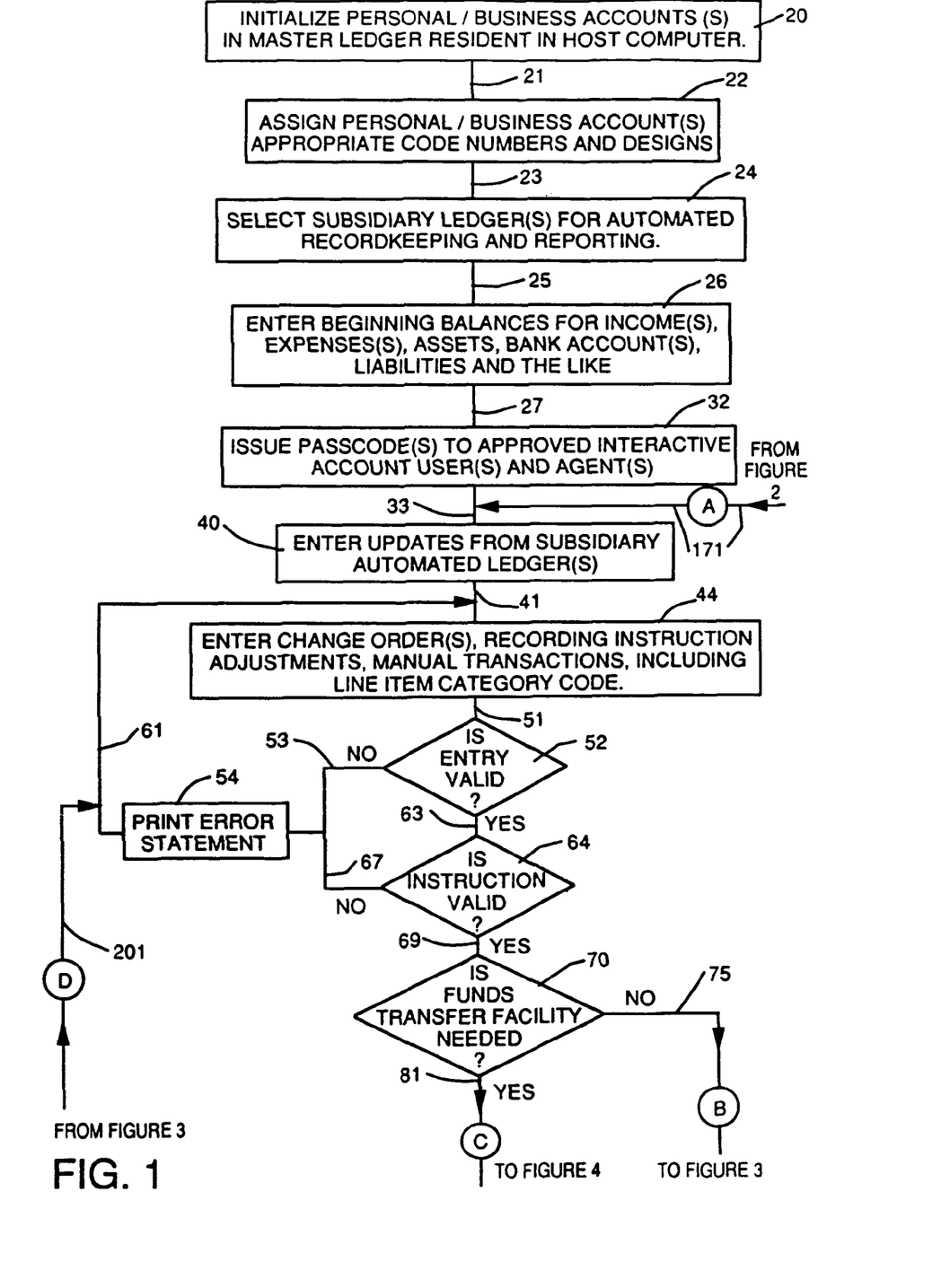
FIGS. 1-4 are flow charts showing the method and system of the invention.

FIGS. 1-4 show a flow chart which illustrates the invention. Referring in particular to FIG. 1, in box 20, the personal and business accounts resident in the master ledger in the host computer are initialized. This may include, for example, selecting automatic coding preferences, source inclusions, business accounting rules, reporting detail, individual job record-keeping and interactive user authorization registrations. All of these selections personalize and customize the master ledger for effective use of the invention. Also, two separate master ledgers can be established, for example separate cash and accrual ledgers, so that desired data can be entered into these ledgers and can be used to provide both tax preparation and cash reports.

The system then proceeds by line 21 to box 22 where the accounts as established above are assigned code numbers. A standardized account menu for business and personal financial transactions is most often times established (see, for example, U.S. Pat. No. 5,193,055), however, establishment of subcategories of income and expense items may be made resulting in more than one detailed subcoding schedule. Standardized account formats are generally used to provide information to outside agents, whereas the more complex subcoded detail is generally retained by the entity using the system for internal use only.

Next, line 23 leads to box 24 where subsidiary ledgers for automated record keeping and reporting are selected. While a master ledger is established in a central or host computer, subsidiary ledgers are established in computers, such as personal computers, at all entities with which the first entity will enter into financial transactions. These subsidiary ledgers can be established with financial institutions, merchants, and other entities with which the entity being served will have financial transactions, including but not limited to automated teller machines, telephonic computers, banks (for checking and savings accounts, for example), investment/brokerage firms, merchants and other automated systems/record keeping devices. Automatic coding devices can be associated with these subsidiary ledgers to record and transmit data concerning the financial transaction at the time of the financial transaction. The key idea is for all of these entities to electronically record, collect, process, store and transmit all financial transactions by all of the entities, including the first entity, that enter into financial transactions with that particular entity. In this way, all of the entities can be connected in a network fashion so that accounting information can be fully and accurately developed among all of the entities. The establishment, operation and transfer of data from the subsidiary ledger to the master ledger will be discussed in greater detail below with respect to FIG. 2.

Referring back to FIG. 1, the subsidiary ledgers that are desired to be included in the master ledger are selected at box 24. Even though every entity with which the first entity is connected will have a subsidiary ledger, the first entity may only desire to have certain data inputs transferred from the subsidiary ledgers to the master ledgers. For example, the first entity may only want data inputs from financial institutions and not merchants. In this box 24, that selection can be made.

After box 24, the system proceeds by line 25 to box 26 where beginning balances for income, expense, asset, bank accounts and liabilities are entered. Next, line 27 leads to box 32 where passcodes are issued to approved interactive account user(s) and agent(s). Agents can include accountants, brokers or other financial advisors. The account user(s) can include the first entity as well as authorized users of the first entity, such as the controller or bookkeeper of a business. This access to the master ledger and subsidiary ledgers allows the agents to perform activities selected from the group consisting of entering, deleting, reviewing, adjusting and processing data inputs in the master ledger and subsidiary ledgers. This access allows agents to enter, delete, review, adjust and process data inputs before, during and after a financial transaction in order to customize the transaction to make it fit into the accounting scheme of the individual entity.

Figure 2:
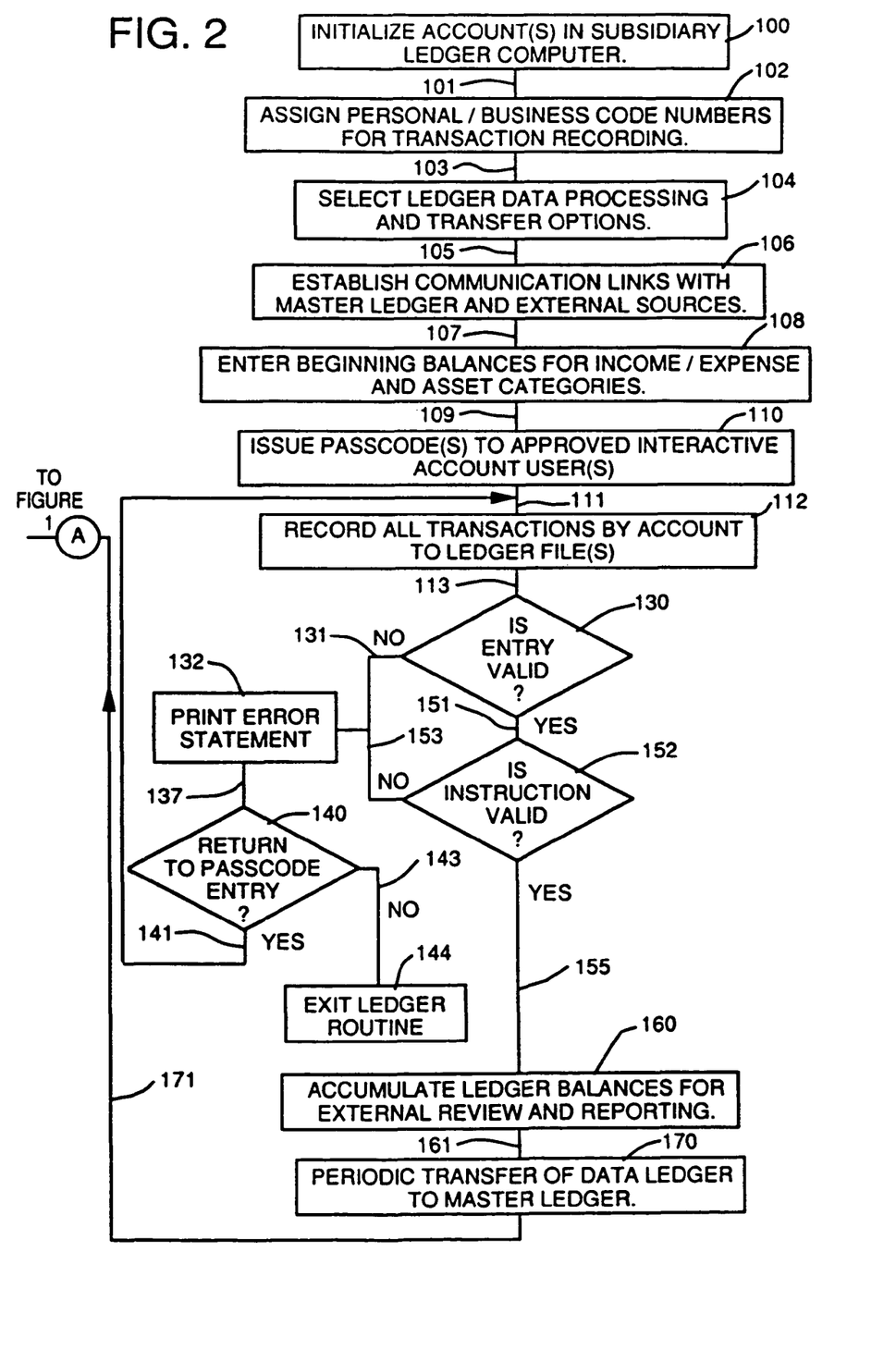

Next, line 33 leads to box 40 where the updates from the subsidiary ledgers are entered into the master ledger. Referring now to FIG. 2, the establishment of, operation of and transfer of data from the subsidiary ledgers will be discussed. It will be appreciated that each of the other entities in the network will have means (usually computers and probably PC's) which will be used to electronically record, collect, process, store and transmit all financial transactions between the first entity (and other entities) with that particular entity.

In box 100, the accounts are initialized in the subsidiary ledger computer. This step is similar to the initialization step in box 20 of FIG. 1. Next, line 101 leads to box 102 where the personal/business code numbers for transaction recording are assigned also similarly to box 22 in FIG. 1. In addition, individual job accounting (receipting and costing) may be automatically facilitated by an alphanumeric identifier at the point of entry. Vendors and payees may be listed by category for automatic ledger entry and coding.

Line 103 then leads to box 104 where the ledger data processing and transfer options are selected. For example, automatic codes and/or instructions are entered into ATM's, point-of-purchase machines, check reading equipment or other systems where the subsidiary ledger is maintained. These codes can identify methods for funds transfer and accounting for each of the subsidiary ledgers. For example, credit balances may be maintained automatically by account until requests for funds transfer are answered with remittance. If no payment is made within a predetermined time, balances are added to personal company payables and receivable lists either automatically or by command.

After this, line 105 leads to box 106 where communication links with the master ledger and external sources are established. It will be appreciated that although agents have access to both the master and subsidiary ledgers, the access can be restricted by instituting predefined communication rules. However, transmittal of transaction records and account balances are made routinely from the subsidiary ledger to the master ledger as will be described below. Line 107 leads to box 108 where the beginning balances for income/expense and asset categories are entered.

Next, line 109 leads to box 110 where passcodes are issued to approved agents. In order to ensure access to the subsidiary ledger by the first entity and agents of the entity being served, passcodes are issued to the approved interactive account user(s) including agents of the entity being served at box 110.

The system then proceeds by line 111 to box 112 where the financial transactions by account are recorded to the subsidiary ledger. For example, in the case of a merchant, the first entity may buy an item and this financial transaction will be recorded. Check imaging equipment may be designed to read check face information including coding for automatic entry into subsidiary ledgers for financial transactions between the entity and other entities. Similarly, a 4-5 digit coding sequence may be installed in ATM transaction files for users to identify sources and uses of funds. Credit card transactions, however, will likely require the entry at the point-of-purchase of appropriate coding information.

Line 113 then leads to decision box 130 where the entry is then reviewed as to whether it is valid or not. If not valid, line 131 leads to box 132 where an error statement is printed. After this, line 137 leads to decision box 140 where a decision must be made to return to passcode entry by line 141 or by line 143 to exit the ledger routine 144.

If the entry is valid, line 151 leads to decision box 152 where the instruction is reviewed for validity. Validity is determined by comparing amounts, codes, vendors and payees with those preestablished coding and decision rules elected in boxes 22, 24 and 102, 104. Invalid entries are recorded separately for security reasons. Valid entries are included in subsidiary and master ledger calculations. More specifically, if the instruction is not valid, line 153 leads to box 132 and the same procedure as was discussed above is repeated. If the instruction is valid, line 155 leads to box 160 where the subsidiary ledger balances for external review and reporting are accumulated.

The system then proceeds by line 161 to box 170 where the periodic transfer of data inputs from the subsidiary ledger to the master ledger is set forth. This can be accomplished by a modem, or other data transfer equipment. This is shown by line 171 which goes to line 33 of FIG. 1.

Referring back to FIG. 1, the data inputs from the subsidiary ledgers are transferred to the master ledger. Line 41 then leads to box 44 where the access to the data inputs in the master ledger is set forth. This access can be provided to interactive users and agents of the first entity. At this box 44, change orders, recording instruction adjustments, manual transactions and the like can be entered by the agents or the interactive users.

After this, line 51 leads to decision box 52 where the validity of the entry is determined. If the entry is not valid, line 53 leads to box 54 where an error statement is printed. Once the error statement is printed, the method returns to box 44 by line 61. If the entry is valid, line 63 leads to decision box 64 where the validity of the instruction is determined. Validity is determined by whether the passcode matches the predesignated list of approved passcodes and whether the entry is complete in form and substance. For example, if either the form or substance of the attempted entry is dissimilar with past transaction records for that user, a request for further information will be initiated. If the instruction is not valid, line 67 leads to box 54 where an error statement is printed. If the instruction is valid, then line 69 leads to decision box 70.

In decision box 70, the user is asked whether the funds transfer facility is needed. If the funds transfer facility is not needed, line 75 leads to the accounting statement module shown in FIG. 3. If the funds transfer facility is needed, line 81 leads to the network transfer facility shown in FIG. 4.

Figure 3:
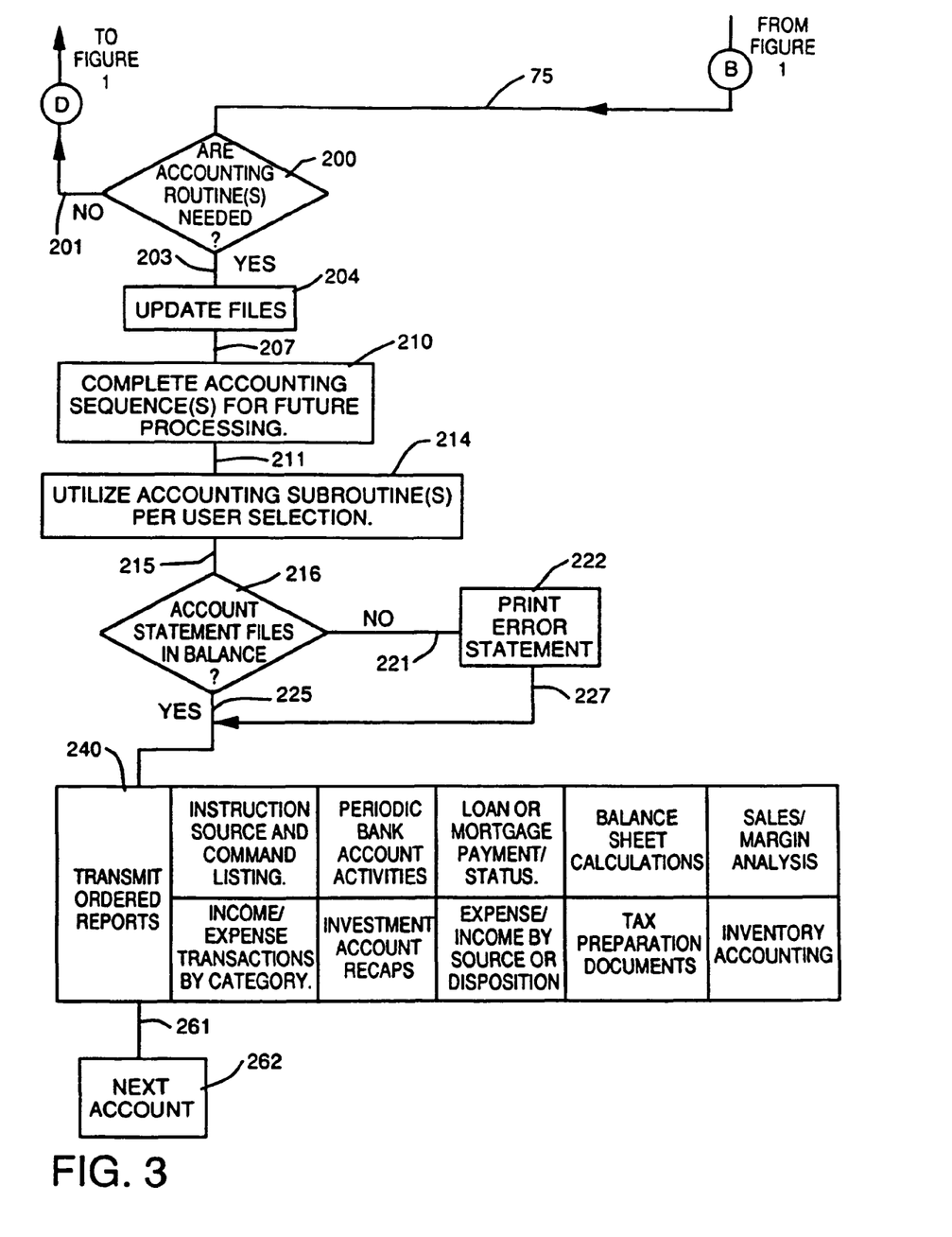

Referring now more particularly to FIG. 3, line 75 leads to a decision box 200 in which the user is asked whether accounting routines are needed. If not, line 201 leads back to line 61 (FIG. 1). If the accounting subroutine is desired, line 203 leads to box 204 where the files are updated according to the entity's report selections. If simple cash accounting routines have been selected, then only those accounting subroutines will be effected. If tax preparation reports are requested, then all accounting subroutines necessary to complete those tax reports are effected. After this line 207 leads to box 210 where the accounting sequences for future processing are completed. For example, daily, weekly, monthly and annual reports, including statistical comparisons for this and other uses, may then be printed at the user's option. Subroutines for each option permit users to personalize individual and business record keeping and reporting.

Line 211 then leads to box 214 where accounting subroutines selected by the first entity are utilized. In this way, the first entity can select one or more or all of the available accounting statements desired. For example, an individual may be only interested in obtaining tax preparation documents, whereas a business may desire a full set of financial documents, including balance sheets and income statements.

Thus, the system is truly a self service system in that the first entity can select the desired accounting reports from a large menu of available reports. The pricing of the system can be tailored to this choice. For example, a first entity needing only two reports would pay less for use of the system than a user needing ten reports.

After this, line 215 leads to a decision box 216 where account statement files are determined to be balanced or not. If not, line 221 leads to box 222 where an error statement is printed. If the account statements are in balance, line 225 leads out of box 216. Line 227 leads out of box 222 after the error statement is printed in order to join line 225. The error statement will direct the entity (or agent) to make appropriate adjustments to coded transactions which result in balanced accounts in both subsidiary and master ledgers.

After this, the ordered reports are transmitted to the entity being served at box 290. Ten separate reports are shown in box 240. The reports can be electronically mailed or hard copies can be produced and forwarded to the user by telefax, messenger, overnight courier or first class mail. The advantage of the system is that these reports can be processed faster than currently available services.

After this, line 261 leads to a box 262 which asks for the next account to be processed.

Figure 4:
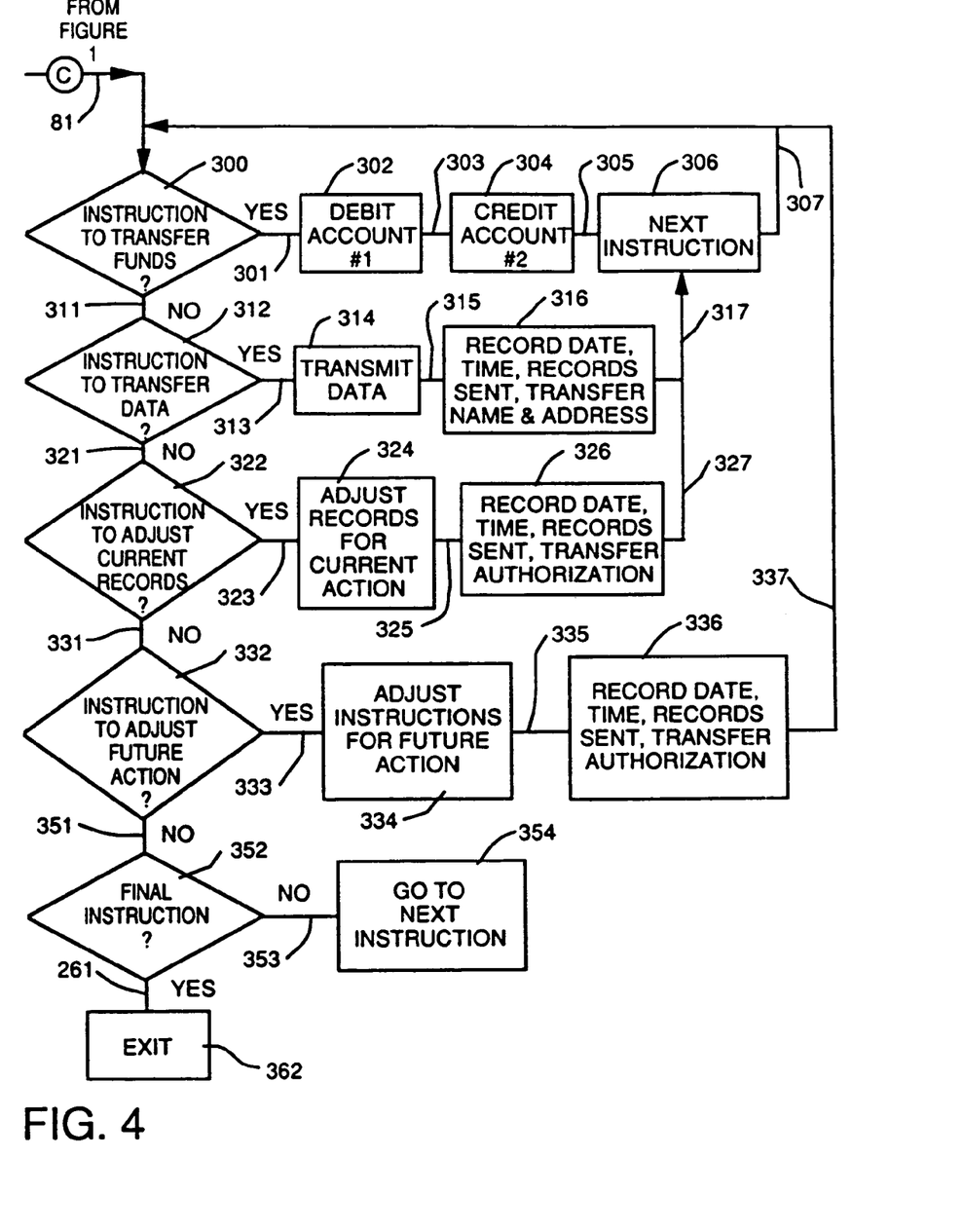

If the funds transfer facility is needed, line 81 leads to decision box 300 where it is asked whether an instruction to transfer funds is desired. The funds transfer facility allows automatic (electronic) transfer of funds/payments by and between the entity's accounts (banks, for example), as instructed. Access to any and all payment clearinghouses is anticipated along with the funds transfer facility. Line 301 leads to box 302 where account no. 1 (that of the merchant, for example) is debited with the funds and then by line 303 to box 304 where account no. 2 (that of the entity being served) is credited. If desired, credit balances may be maintained automatically by account until requests for funds transfers are answered with remittance. If no payment is made within a predetermined time, balances are added to company and payables and receivables lists either automatically or by command. After this, line 305 leads to box 306 where the next instruction is requested and then by line 307 back to box 300 to start the process again.

If a transfer funds instruction is not requested, line 311 leads to decision box 312 where the user is asked whether there is an instruction to transfer data. For example, an entity may elect to transfer vital operating statistics to a banker for loan monitoring purposes. Suppliers of material can ship replacement inventory quickly and accurately with current sales history and inventory replenishment requirements transmittals. Finally, payroll statistics are often times required to be provided by the entity to government agencies, health providers, labor unions, and the like. If so, line 313 leads to box 314 where the data is transmitted and then by line 315 to box 316 where the date, time, records sent, transfer name and address are recorded. After this, line 317 leads to box 306 where the next instruction is requested.

If a transfer data instruction is not requested, line 321 leads to decision box 322 where the user is asked whether there is an instruction to adjust current records. Entities or agents can enter coded records of financial transactions or adjust current account records when certain transactions have not been automatically recorded by the system and when errors in previous entries have occurred. If so, line 323 leads to box 324 where the records are adjusted for current action and then by line 325 to box 326 where the date, time, records sent, and transfer authorization are recorded. After this, line 327 leads to box 306 where the next instruction is requested.

If an adjust current records instruction is not requested, line 331 leads to decision box 332 where the user is asked whether there is an instruction to adjust future action. Periodically, entities and users must change decision rules previously entered into the system. Adjustments in system recording or reporting may stem from changes in generally accepted accounting principles, reporting period changes, depreciation adjustments, income or expense category additions or deletions, cash versus accrual interpretations, statistical comparison definitions and the like. Line 333 leads to box 334 where the instructions are adjusted for future action. After this, line 335 leads to box 336 where the date, time, records sent and transfer authorization are recorded. After this, line 337 leads back to box 300 at the beginning of the network transfer facility module.

If an adjust future action instruction is not requested, line 351 leads to decision box 352 where the user is asked whether this is a final instruction. If not, line 353 leads to box 354 where the method goes to the next instruction. If it is the final instruction, line 361 leads to box 362 where the funds transfer facility is exited.

It will be appreciated that an automated accounting system is shown in which a first entity and other entities with which the first entity enters into financial transactions are in a connected network. Access is provided to the electronically recorded financial transactions for agents of the first entity, such as accountants. These agents can perform activities such as entering, deleting, reviewing, adjusting and processing data inputs. In addition, accounting reports can be generated and a funds transfer facility is provided.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A financial accounting system for providing financial accounting statements for a first entity, comprising:
   a first computer having at least one file from which an accounting statement is generated;
   a second computer receiving data inputs, said data inputs including electronically recorded financial transaction information made between said first entity and a plurality of other entities; and
   an open communication network comprising data transfer equipment transferring said data inputs from said second computer to said file of said first computer, said open communication network connecting said first computer and said second computer in an accounting system in which said entities are interconnected for automated accounting of financial transactions utilizing standardized codes, wherein said data inputs in said file of said first computer are used to produce said accounting statements derived from said financial transaction information including income, expense, asset or liability information for said first entity.

2. The system of claim 1, including:
   a first said file in said first computer for receiving accrual accounting data inputs; and
   a second said file in said first computer for receiving cash accounting data inputs.

3. The system of claim 1, including means for transferring funds from said first entity to said other entities.

4. The system of claim 1, wherein said second computer electronically records, collects, processes, stores and transmits said financial transactions.

5. The system of claim 1, wherein said first computer is a personal computer.

6. The system of claim 1, wherein said second computer is a personal computer.

7. A financial accounting system comprising:
   a financial accounting computer, and
   at least one ledger file on said financial accounting computer;
   wherein said financial accounting computer is configured to receive data inputs from a financial transaction computer, said financial transaction computer configured to receive said data inputs including electronically recorded financial transactions made between a first entity and a second entity, and wherein said financial accounting computer stores said data inputs in said at least one ledger file, said data inputs including an electronic representation of said financial transactions made between said first entity and said second entity;
   wherein said financial accounting computer and said financial transaction computer are coupled via an open communication network comprising data transfer equipment transferring said data inputs from said second computer to said file of said first computer, said open communication network connecting said first computer and said second computer in an accounting system in which said entities are interconnected for automated accounting of financial transactions utilizing standardized codes; and
   wherein said first entity or an agent of said first entity access said file to perform at least one of entering, deleting, reviewing, adjusting or processing said data inputs.

8. A financial accounting system for a first entity such as an individual or a business, said system comprising:
   a financial accounting computer having at least one file, wherein said financial accounting computer cooperates with a financial transaction computer for receiving data inputs, said data inputs including electronically recorded financial transactions made between said first entity and a plurality of other entities; and
   said financial accounting computer coupled to an open communication network comprising data transfer equipment transferring said data inputs from said second computer to said file of said first computer, said open communication network connecting said first computer and said second computer in an accounting system in which said entities are interconnected for automated accounting of financial transactions utilizing standardized codes, wherein said first entity or agents of said first entity access said file of said financial accounting computer so that said first entity or said agents can perform one or more activities selected from the group consisting of entering, deleting, reviewing, adjusting and processing said data inputs.

* * * * *

(12) INTER PARTES REEXAMINATION CERTIFICATE (878th)
United States Patent
Brown (10) Number: US 7,822,657 C1
(45) Certificate Issued: *May 14, 2014

(54) AUTOMATED ACCOUNTING SYSTEM (75) Inventor: Gordon T. Brown, Pittsburgh, PA (US)

(73) Assignee: Noah Systems, Inc., Pittsburgh, PA (US)

Reexamination Request:
No. 95/001,580, Mar. 18, 2011

Reexamination Certificate for:
Patent No.: 7,822,657
Issued: Oct. 26, 2010
Appl. No.: 09/975,458
Filed: Oct. 11, 2001

(*) Notice: This patent is subject to a terminal disclaimer.

Related U.S. Application Data

(63) Continuation of application No. 08/313,988, filed on Sep. 28, 1994, now abandoned.

(51) Int. Cl.
*G06Q 40/00* (2012.01)
*G06Q 20/10* (2012.01)
*G06Q 40/02* (2012.01)

(52) U.S. Cl.
CPC ............... *G06Q 20/10* (2013.01); *G06Q 40/00* (2013.01); *G06Q 40/12* (2013.01); *G06Q 40/02* (2013.01)
USPC .......................................... 705/35

(58) Field of Classification Search
USPC .......................................... 705/35
See application file for complete search history.

(56) References Cited

To view the complete listing of prior art documents cited during the proceeding for Reexamination Control Number 95/001,580, please refer to the USPTO's public Patent Application Information Retrieval (PAIR) system under the Display References tab.

*Primary Examiner* — Samuel Rimell (57) ABSTRACT

An automated accounting system for an entity, such as an individual or business is provided in which at least one file is established for the entity and a plurality of data inputs are provided to the file. The data inputs include electronically recorded transactions made between the entity and other entities. Access is provided to the file for agents of the entity so that one of the agents can perform one or more activities related to the data inputs such as entering, deleting, reviewing, adjusting and processing.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-8 are cancelled.

* * * * *